United States Patent
Shen et al.

(10) Patent No.: US 11,265,322 B2
(45) Date of Patent: *Mar. 1, 2022

(54) DATA ISOLATION IN BLOCKCHAIN NETWORKS

(71) Applicant: Advanced New Technologies Co., Ltd., Grand Cayman (KY)

(72) Inventors: Chao Shen, Hangzhou (CN); Wenbin Zhang, Hangzhou (CN); Xuming Lu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,599

(22) Filed: Aug. 23, 2021

(65) Prior Publication Data

US 2021/0385223 A1 Dec. 9, 2021

Related U.S. Application Data

(63) Continuation of application No. 16/587,234, filed on Sep. 30, 2019, which is a continuation of application No. PCT/CN2019/078944, filed on Mar. 21, 2019.

(51) Int. Cl.
*H04L 9/06* (2006.01)
*H04L 9/32* (2006.01)
(Continued)

(52) U.S. Cl.
CPC ........ *H04L 63/101* (2013.01); *G06F 16/2246* (2019.01); *G06F 16/27* (2019.01);
(Continued)

(58) Field of Classification Search
CPC ... H04L 63/101; H04L 9/0637; H04L 9/0643; G06F 16/27; G06F 16/2246
See application file for complete search history.

(56) References Cited

U.S. PATENT DOCUMENTS

| 9,635,000 | B1 | 4/2017 | Muftic |
| 10,365,922 | B1 | 7/2019 | Wang et al. |

(Continued)

FOREIGN PATENT DOCUMENTS

| CN | 106559211 | 4/2017 |
| CN | 106899412 | 6/2017 |

(Continued)

OTHER PUBLICATIONS

Crosby et al., "BlockChain Technology: Beyond Bitcoin." Sutardja Center for Entrepreneurship & Technology Technical Report. Oct. 16, 2015, 35 pages.

(Continued)

*Primary Examiner* — Mohammad A Siddiqi
(74) *Attorney, Agent, or Firm* — Fish & Richardson P.C.

(57) ABSTRACT

Implementations of this specification include receiving a synchronization request from a light-weight node of the blockchain network including an identity of the light-weight node; identifying one or more permissions associated with the identity of the light-weight node; determining an original world state structure associated with the block height and including a plurality of account records; identifying based on the one or more permissions, a subset of the plurality of account records that are authorized for access by the light-weight node; generating an isolated world state structure based on the original world state data structure including only the subset of the plurality of account records that are authorized for access by the light-weight node; sending a response to the light-weight node that includes the isolated world state data structure.

15 Claims, 7 Drawing Sheets

(51) Int. Cl.
*H04L 29/06* (2006.01)
*G06F 16/22* (2019.01)
*G06F 16/27* (2019.01)

(52) U.S. Cl.
CPC .......... *H04L 9/0637* (2013.01); *H04L 9/0643* (2013.01); *H04L 2209/38* (2013.01)

(56) References Cited

U.S. PATENT DOCUMENTS

| | | | | |
|---|---|---|---|---|
| 2017/0132621 | A1* | 5/2017 | Miller | G06Q 20/065 |
| 2017/0140375 | A1 | 5/2017 | Kunstel | |
| 2017/0345011 | A1 | 11/2017 | Salami et al. | |
| 2018/0039667 | A1 | 2/2018 | Pierce et al. | |
| 2018/0247191 | A1 | 8/2018 | Katz et al. | |
| 2018/0343126 | A1 | 11/2018 | Fallah et al. | |
| 2018/0349621 | A1* | 12/2018 | Schvey | H04L 9/0643 |
| 2018/0374173 | A1 | 12/2018 | Chen et al. | |
| 2019/0080392 | A1* | 3/2019 | Youb | G06F 21/64 |
| 2019/0104196 | A1 | 4/2019 | Li et al. | |
| 2019/0158275 | A1 | 5/2019 | Beck | |
| 2019/0180047 | A1* | 6/2019 | Matetic | H04L 9/3247 |
| 2019/0278758 | A1 | 9/2019 | Zhang et al. | |
| 2020/0304505 | A1* | 9/2020 | Shen | H04L 9/0637 |

FOREIGN PATENT DOCUMENTS

| | | |
|---|---|---|
| CN | 108230109 | 6/2018 |
| CN | 108563788 | 9/2018 |
| CN | 109002349 | 12/2018 |
| CN | 109326337 | 2/2019 |
| CN | 109492419 | 3/2019 |
| EP | 3560143 | 10/2019 |
| JP | 2020522796 | 7/2020 |
| TW | M572512 | 1/2019 |
| WO | WO 2018119585 | 7/2018 |

OTHER PUBLICATIONS

Extended European Search Report in European Application No. 21176865.0, dated Aug. 19, 2021, 12 pages.
Extended European Search Report in European Appln No. 19725912.0, dated Apr. 24, 2020, 12 pages.
GitHub.com [online]. "Light client protocolethereum/wiki wiki. GitHub," Feb. 17, 2019, retreieved on Apr. 16, 2020, retrieved from URL<https://web.archive.org/web/20190217164308/https://github.com/ethereum/wiki/wiki/Light-client-protocol>, 6 pages.
Jordan, medium.com [online], "A Primer on Ethereum Blockchain Light Clients," May 19, 2018, retrieved on Dec. 9, 2020, retrieved from URL<https://medium.com/@rauljordan/a-primer-on-ethereum-blockchain-light-clients-f3cadde49137>, 8 pages.
McCallum, medium.com [online], "Diving into Ethereum's world state," Oct. 30, 2018, retrieved on Aug. 10, 2021, retrieved from URL<https://medium.com/cybermiles/diving-into-ethereums-world-state-c893102030ed>, 19 pages.
Nakamoto, "Bitcoin: A Peer-to-Peer Electronic Cash System," www.bitcoin.org, 2005, 9 pages.
PCT International Search Report and Written Opinion in International Appln. PCT/CN2019/078944, dated Dec. 20, 2019, 8 pages.
Qian, "Improved Authenticated Data Structures for Blockchain Synchronization," University of Illinois at Urbana-Champaign, 2018, pp. 1-38.

* cited by examiner

DATA ISOLATION IN BLOCKCHAIN NETWORKS

CROSS-REFERENCE TO RELATED APPLICATIONS

This application is a continuation of and claims the benefit of priority of U.S. patent application Ser. No. 16/587,234, filed on Sep. 30, 2019, which is a continuation of PCT Application No. PCT/CN2019/078944, filed on Mar. 21, 2019, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular use case. Types of blockchain networks can include public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

Blockchain networks may include different types of nodes. Fully-participating nodes (hereinafter referred to as "blockchain nodes") participate in the consensus process for the blockchain network by attempting to construct and validate new blocks of transactions to add to the blockchain. Light-weight nodes do not participate in the consensus process for the blockchain network, and may not fully synchronize their own internal representation of the blockchain. For example, a light-weight node may synchronize only the block header information rather than all of the transaction data in a particular block in the blockchain.

In private or consortium blockchain networks, nodes (such as the light-weight nodes) may only have permission to read certain transactions from the blockchain, such as, for example, transactions in which an identity associated with the light-weight node participated. In such a case, the light-weight node may query a blockchain node for a particular block, and may be returned a representation (e.g., a Merkle Tree) of only transactions which it has access in the block. A Merkle Tree constructed in this manner may be inconsistent with the full Merkle Tree representing the transactions in the block, which can lead to errors at the light-weight node due to the node not possessing an accurate representation of the block.

The "world state" of a blockchain network refers to a collection of states of all ordinary accounts and contract accounts on the blockchain network, which are typically stored in blockchain nodes in the structure of a Merkle Patricia Trie (MPT). In the blockchain network, some participants maintain a blockchain node that participates in the consensus, while some participants only maintain one lightweight node. This can be because of cost or authority, and nodes not participating in the consensus, but only synchronizing data from the blockchain node.

Light-weight nodes can store complete data of all blocks, or just block header data. For example, various example blockchain networks have light-weight nodes where only the block header data is synchronized. A light-weight node pulls corresponding data on the MPT from a blockchain node according to a transaction to be verified, and the blockchain node does not limit the range in which the light-weight node pulls the data.

In some scenarios, especially in a federated chain scenario of an enterprise application, access to the world state data can be controlled. For example, a particular entity may only be authorized to access world state data for accounts it controls. However, light weight nodes controlled by the entity may receive the entire MPT in order to verify transactions. Accordingly, it would be desirable to control the light weight node's access to information in the MPT according to the configured permissions, while still allowing the lightweight node to verify transactions based on the MPT.

SUMMARY

Implementations of this specification include computer-implemented methods for an isolation scheme for world state data of a blockchain network to satisfy isolation requirements for light-weight nodes of the blockchain network. More particularly, implementations of this specification are directed to generating a state Merkle Patricia Trie (MPT) (or an "isolated MPT") that does not include data that is not authorized for access by a light-weight node but is still consistent with world state data of the blockchain network.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more implementations of this specification are set forth in the accompanying drawings and the description below. Other features and advantages of this specification will be apparent from the description and drawings, and from the claims.

DESCRIPTION OF DRAWINGS

Like reference symbols in the various drawings indicate like elements.

DETAILED DESCRIPTION

Implementations of this specification include computer-implemented methods for an isolation scheme for world state data of a blockchain network to satisfy isolation requirements for light-weight nodes of the blockchain network. More particularly, implementations of this specification are directed to generating an isolated state Merkle Patricia Trie (MPT) (or an "isolated MPT") that does not include data that is not authorized for access by a light-weight node but is still consistent with world state data of the blockchain network.

In some implementations of the methods, actions include receiving, by a blockchain node in the blockchain network, a synchronization request from a light-weight node of the blockchain network, wherein the synchronization request includes an identity of the light-weight node and a block height associated with the synchronization request; identifying, by the blockchain node, one or more permissions associated with the identity of the light-weight node; determining, by the blockchain node, an original world state structure associated with the block height and including a plurality of account records, each account record storing state information for an account associated with the account record, wherein the original world state structure represents a state of the blockchain network at a time when a block associated with the block height was added to the blockchain; identifying, by the blockchain node and based on the one or more permissions, a subset of the plurality of account records that are authorized for access by the light-weight node; generating, by the blockchain node, an isolated world state structure based on the original world state data structure, the isolated world state structure including only the subset of the plurality of account records that are authorized for access by the light-weight node; and sending, by the blockchain node, a response to the light-weight node that includes the isolated world state data structure.

To provide further context for implementations of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Implementations of this specification are described in further detail herein with reference to a consortium blockchain network. It is contemplated, however, that implementations of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

A Merkle Patricia Trie or "MPT" is a data structure that allows stored to data to be search and verified quickly. An MPT combines aspects of a Merkle tree and a Patricia trie. A Merkle tree is a binary tree structure in which a hash of a data item is stored in each leaf node. Each non-leaf node includes a hash of the concatenation of the hashes of its two child nodes. This structure ensures that a change to any of the data items hashed in the leaf nodes (which will change that nodes hash) will also cause a change in the root hash of the tree. Thus, an asserted value of a data item hashed in the Merkle tree can be verified by checking whether a hash of the asserted value is consistent with the tree (i.e., whether the root hash changes).

A Patricia trie is a structure that organizes data stored in leaf nodes based on a key (e.g., a hash) representing the stored data. Each non-leaf node of the tree is associated with a prefix of the key values. Each leaf node is stored as a child of the node having the longest matching prefix. This allows for a node having a particular key value to be found quickly by traversing the Patricia trie starting from the root and following a path of prefix nodes that match the particular key value.

An MPT combines the concepts of a Merkle tree and a Patricia trie, and includes three types of nodes. Leaf nodes store data associated with keys (e.g., hashes). Branch nodes function as a "router" that maps a number of values (e.g., each of 26 characters, or each of 16 hexadecimal digits) to a child node, and also store data associated with keys ending here. The child node can either be a leaf node or an extension node, which is a node including a key portion that is common to all of its child nodes.

In some cases, an MPT can be used to store the state of accounts in a blockchain network. For example, each block in a blockchain can include a reference to an MPT storing account records including balances for each account in the blockchain network at the time the block was added to the blockchain. The account records can be organized in the MPT based on a public key associated with the account. Such an MPT can provide a snapshot of the "world state" of the blockchain network the time the block was added to the chain.

Implementations of this specification are described in further detail herein in view of the above context. More particularly, and as introduced above, implementations of this specification are directed to producing an isolated MPT that does not include data within a world state data structure that is not authorized for access by a light-weight network, but that is still consistent with a full MPT representing the world state data structure. The isolated MPT can be provided to the light-weight node in response to a world state synchronization request for so that the data structure of the MPT locally stored on the light-weight network is consistent with the world state data structure of the blockchain network (without requiring access to restricted data by the light-weight node).

In some implementations, a light-weight node of a blockchain network can provide a synchronization request to a blockchain node of the blockchain network. The synchronization request can include an identity of the light-weight node, e.g., an entity that manages the light-weight node, and a block height associated with the synchronization request. The blockchain node can identify one or more permissions associated with the identity of the light-weight node and identify an original MPT representing a world state data structure of the blockchain network and containing a plurality of account records that are within the block height specified by the synchronization request. The blockchain node identifies a subset of the plurality of account records that are authorized for access by the light-weight node based on the one or more permissions associated with the identity of the light-weight node. The blockchain node generates an isolated MPT based on the original MPT. The isolated MPT only includes the subset of account records that are authorized for access by the light-weight node. The isolated MPT is then sent to the light-weight node and stored locally at the light-weight node and used for world state data synchronization with the blockchain network. As discussed below, the isolated MPT can include a data structure that is consistent with the world state data structure of the blockchain network without including data that is not permissioned or authorized for access by the light-weight node.

Figure 1:
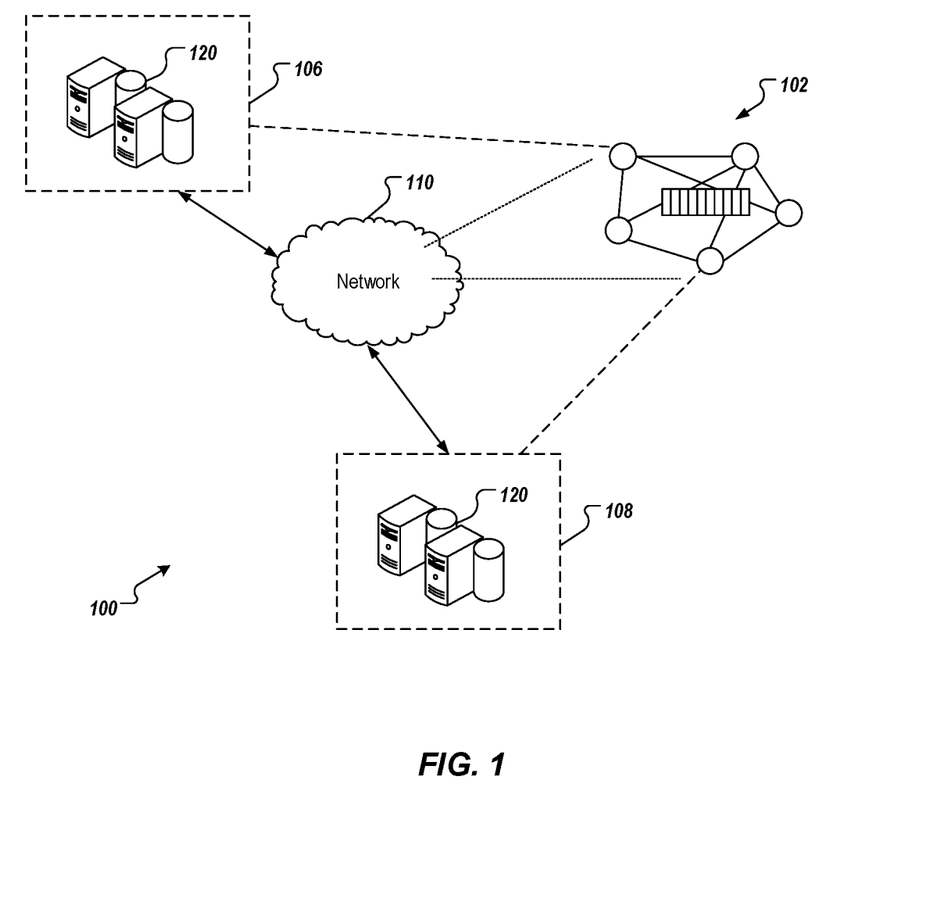
FIG. 1 depicts an example of an environment that can be used to execute implementations of this specification.

FIG. 1 is a diagram illustrating an example of an environment 100 that can be used to execute implementations of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
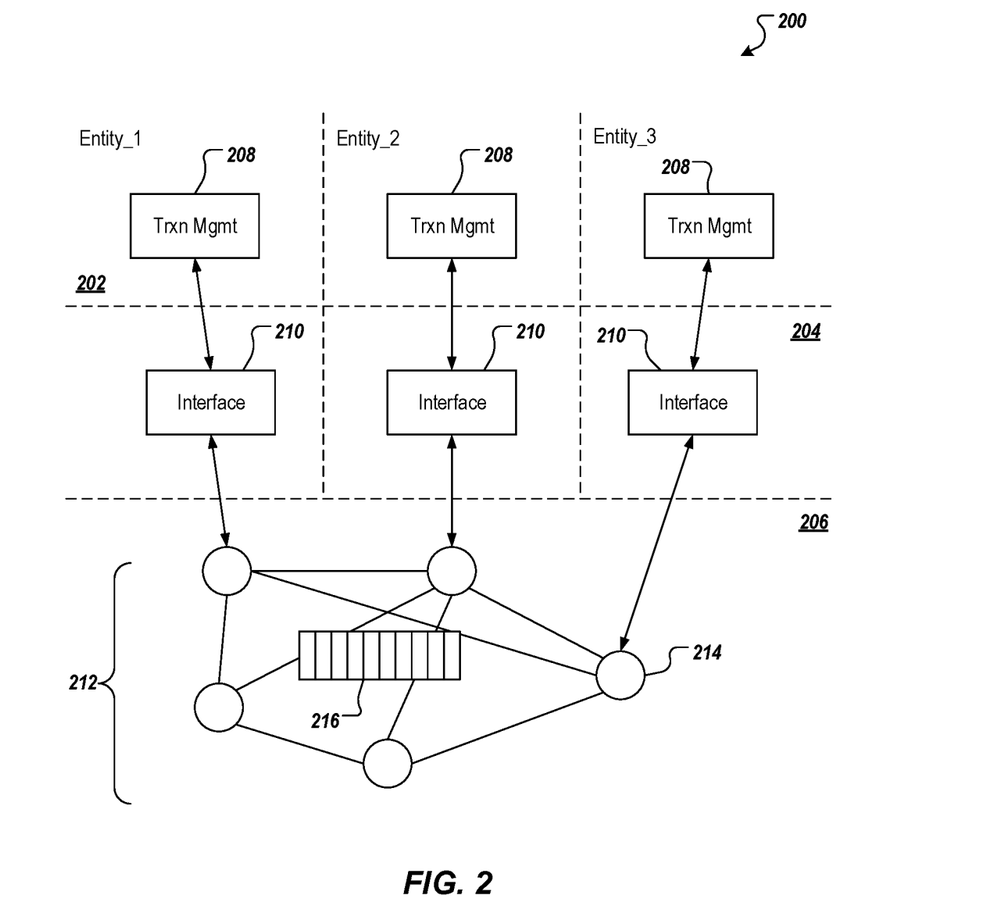
FIG. 2 depicts an example of a conceptual architecture in accordance with implementations of this specification.

FIG. 2 depicts an example of a conceptual architecture 200 in accordance with implementations of this specification. The conceptual architecture 200 includes an entity layer 202, a hosted services layer 204, and a blockchain network layer 206. In the depicted example, the entity layer 202 includes three participants, Participant A, Participant B, and Participant C, each participant having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the consortium blockchain network.

A blockchain (e.g., the blockchain 216 of FIG. 2) is made up of a chain of blocks, each block storing data. For example, the data can include transaction data representative of a transaction between two or more participants. While transactions are used herein by way of non-limiting example, it is contemplated that any appropriate data can be stored in a blockchain (e.g., documents, images, videos, audio). Example transactions can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed.

Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Examples of cryptographic methods include, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
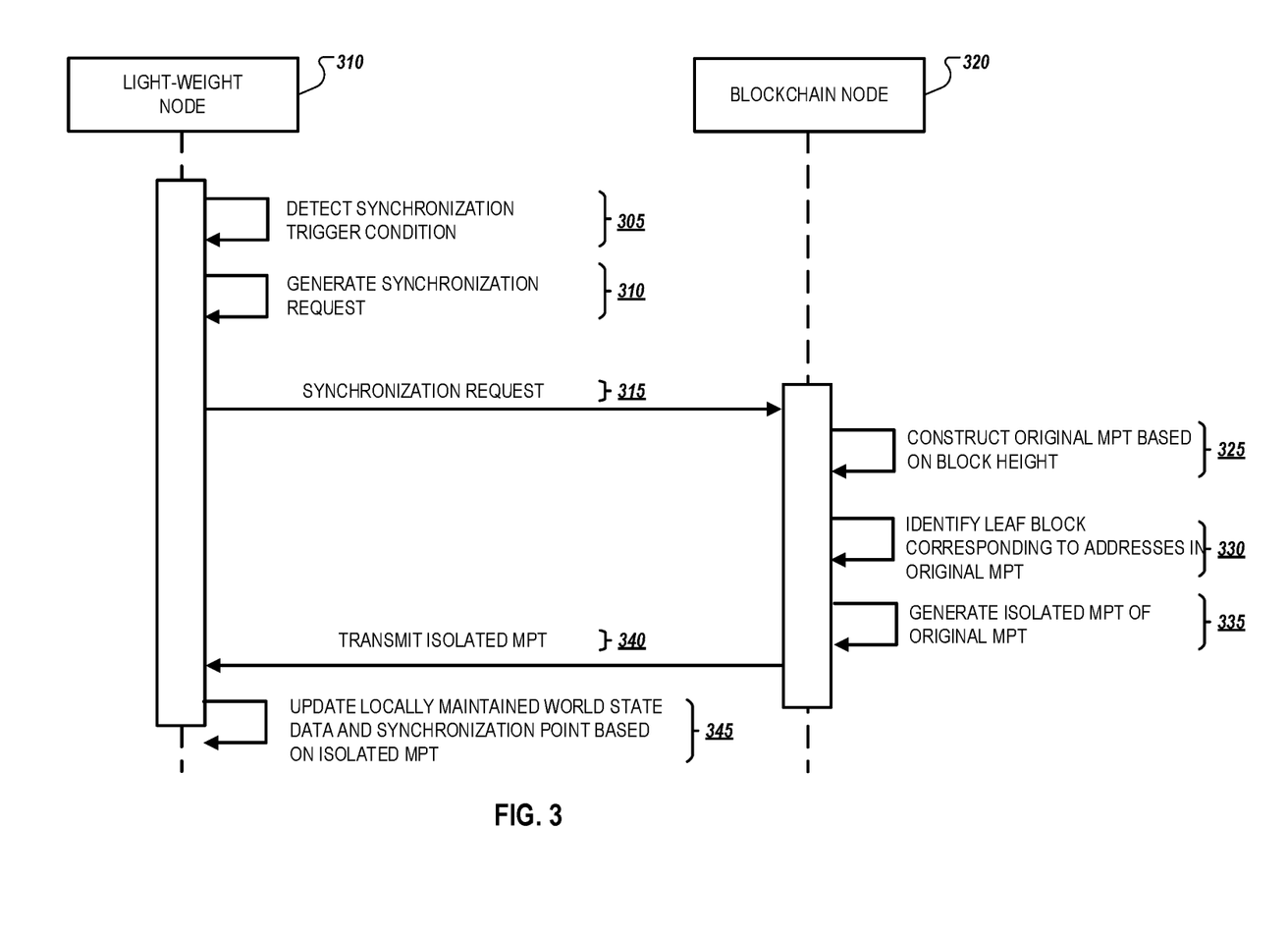
FIG. 3 depicts an example of an interaction between a light-weight node and a blockchain node of a blockchain network during a world state synchronization process.

FIG. 3 depicts an example of an interaction between a light-weight node 310 and a blockchain node 320 of a blockchain network, e.g., the blockchain network 212 of FIG. 2, during a world state synchronization process. The world state synchronization process proceeds in steps shown in FIG. 3. At 305, the light-weight node 310 initially detects a synchronization trigger condition. For example, a synchronization trigger condition can indicate that the light-weight node 310 has exceeded a set threshold from the most recent synchronization point, such as the number of blocks from the most recent synchronization point. In other examples, the synchronization trigger condition can be specified events of the blockchain node 320 that are detected by the light-weight node 310 and used to initiate the synchronization process. For instance, the light-weight node 310 can receive an event message from the blockchain node 320, and in response, initiate the synchronization process based on receiving the event message. In some other examples, the synchronization trigger condition can represent external call triggering through a service interface that is provided by the light-weight node 310 and enables a user or entity to actively, e.g., manually, trigger the synchronization process.

At 310, the light-weight node 310 generates a world state synchronization request based on the detection of the synchronization trigger condition at step 305. Specifically, the light-weight node 310 can pull a range list, e.g., a list of addresses or identifiers for which account records are to be synchronized. The synchronization request can also identify a block height for synchronization. As described herein, the block height represents a number of blocks in the chain between the first block to be synchronized and the genesis block, i.e., a block that has a 0 block height.

At 315, the light-weight node 310 sends the synchronization request to the blockchain node 320. The synchronization request can include an identity certificate representing the identity of an entity that manages or is otherwise associated with the light-weight node 310. As described below, the identity certificate can be used to determine the data in the blockchain that are authorized for access by the light-weight node 310, e.g., account records with addresses that are associated with the identity certificate, as well as data in the blockchain that are not authorized for access by the light-weight node 310, e.g., account records with addresses for entities other than the entity that manages the light-weight node 310.

Figure 4A:
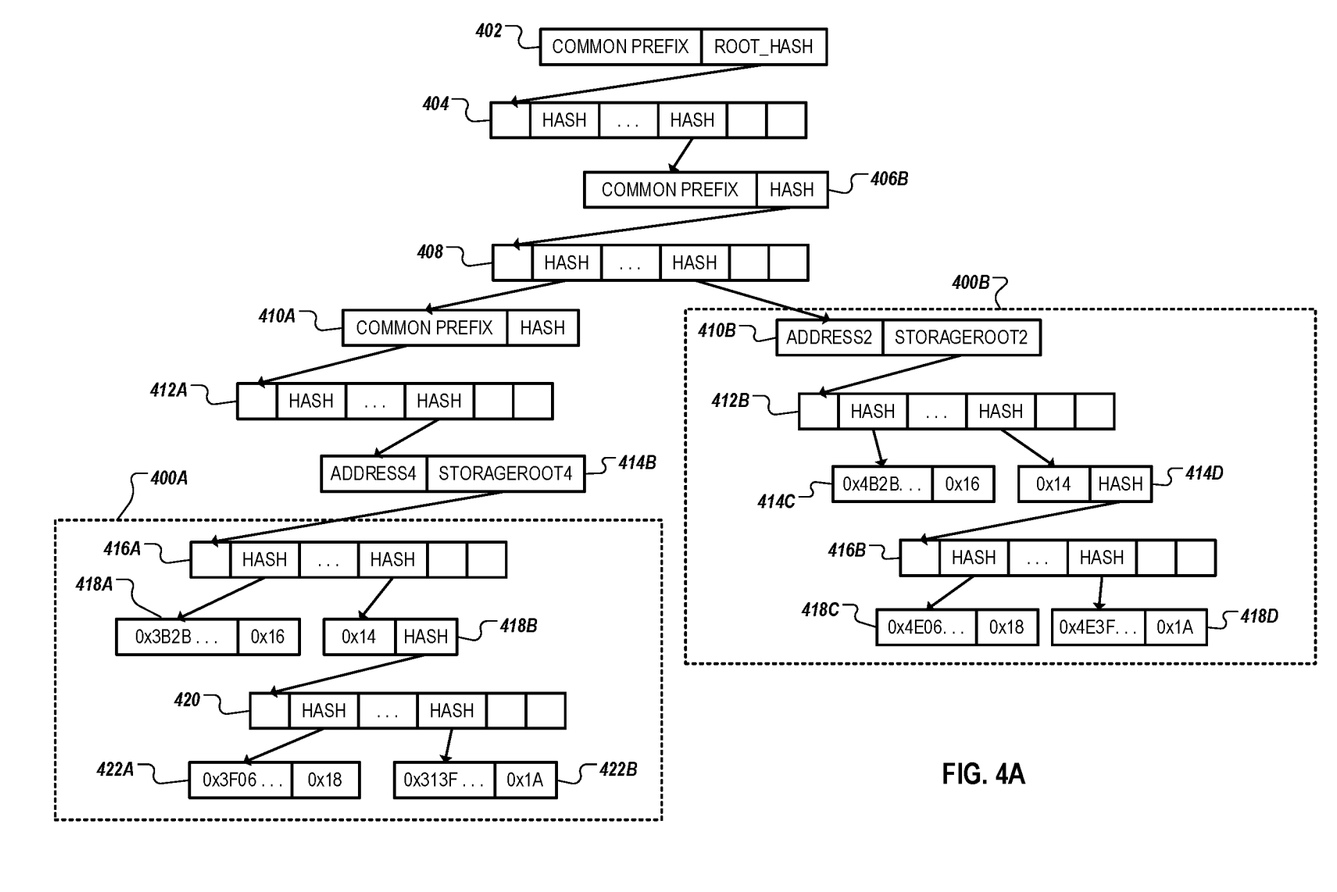
FIG. 4A depicts an example of a world state data structure for the blockchain node depicted in FIG. 3.

At 325, the blockchain node 320 identifies an original MPT representing the world state of the blockchain corresponding to the block height in the synchronization request. For example, the blockchain node can identify the MPT stored in the block header of the block in the blockchain corresponding to the block height as the original MPT. An example of an original MPT that represents the world state structure of the blockchain network is depicted in FIG. 4A.

At 330, the blockchain node 320 identifies a leaf block corresponding to addresses included in the world state structure of the original MPT. The blockchain node 320 can parse the original MPT and determine whether an address associated with each account record is authorized for access by the light-weight node 310. For example, the blockchain node 320 can determine that the light-weight node 310 is authorized to access an account record if it includes an address that is associated with the entity of the light-weight node 310.

At 335, the blockchain node 320 generates an isolated MPT based on the original MPT. The isolated MPT only includes a subset of the account records from the original MPT that are authorized for access by the light-weight node 310.

In some implementations, the blockchain node 320 generates the isolated MPT by accessing an access control table stored on the blockchain node 320. The access control table can be used to determine individual account records represented in the world state data structure of the original MPT that are authorized for access by the light-weight node 310. The access control table can specify permissions for entities associated with light-weight nodes of a blockchain network. For example, the access control table can specify an identity class associated with each entity such that entities assigned to different identity classes can have different permission levels for accessing secure account records. For instance, one permission level for an identity class can indicate that entities are authorized to access all account records associated with a particular entity.

In some instances, the permissions specified by the access control table can include a set of permissioned account addresses for which a light-weight node is authorized to access account data. In such instances, the blockchain node 320 uses the set of permissioned account addresses to identify account records that are permissioned for access by the light-weight node 310, e.g., account records that include a permissioned account address, and account records that are not permissioned for access by the light-weight node 310, e.g., account records that include an account address that is not included in the set of permissioned account addresses. The blockchain node 320 generates the isolated MPT such that the account records that are not permissioned for access are omitted from the world state data structure represented by the original MPT.

At 340, the blockchain node 320 sends the isolated MPT to the light-weight node 310 as a response to the synchronization request received at step 315. At 345, the light-weight node 310 updates locally-maintained world state data and a synchronization point based on the isolated MPT. For example, the light-weight node 310 can store the world state data structure specified in the isolated MPT as the locally maintained world state until the next synchronization point.

FIG. 4A depicts an example of a world state data structure represented by an MPT 400 for the blockchain node. In this example, the MPT 400 is generated by a blockchain node, e.g., the blockchain node 320, in responding to receiving a world state synchronization request from a light-weight node, e.g., the light-weight node 310. In some cases, the MPT 400 represents a world state of the blockchain network at the time the block at the specific block height was added to the chain.

In some cases, the world state data structure of the MPT 400 is organized according to public keys identifying the accounts represented by each account record. As previously discussed, the MPT includes leaf nodes (e.g., 422A, 422B) that store account records, branch nodes (e.g., 416A, 420) that function as a "router" that maps a number of values (e.g., each of 26 characters, or each of 16 hexadecimal digits) to a child node and may also store an account record, and extension nodes (e.g., 406B, 410A, 418B) that include a key portion that is common to all of its child nodes. As described above, each of the leaf nodes in the MPT (e.g., 422A, 422B) are account records that include a public key associated with a particular account in the blockchain network, and state data associated with the particular account, such as an account balance. In addition, each branch node may also store an account record with a key corresponding to the branch node's position in the MPT.

As discussed above, the MPT 400 includes account records that are authorized for access by the light-weight node, e.g., account records that include addresses of the entity associated with the light-weight node, and account records that are not authorized for access by the light-weight node.

In the example depicted in FIG. 4A, account records included in region 400B of the MPT 400 are not authorized for access by the light-weight node 310, while account records included in region 400A are authorized for access by the light-weight node.

Figure 4B:
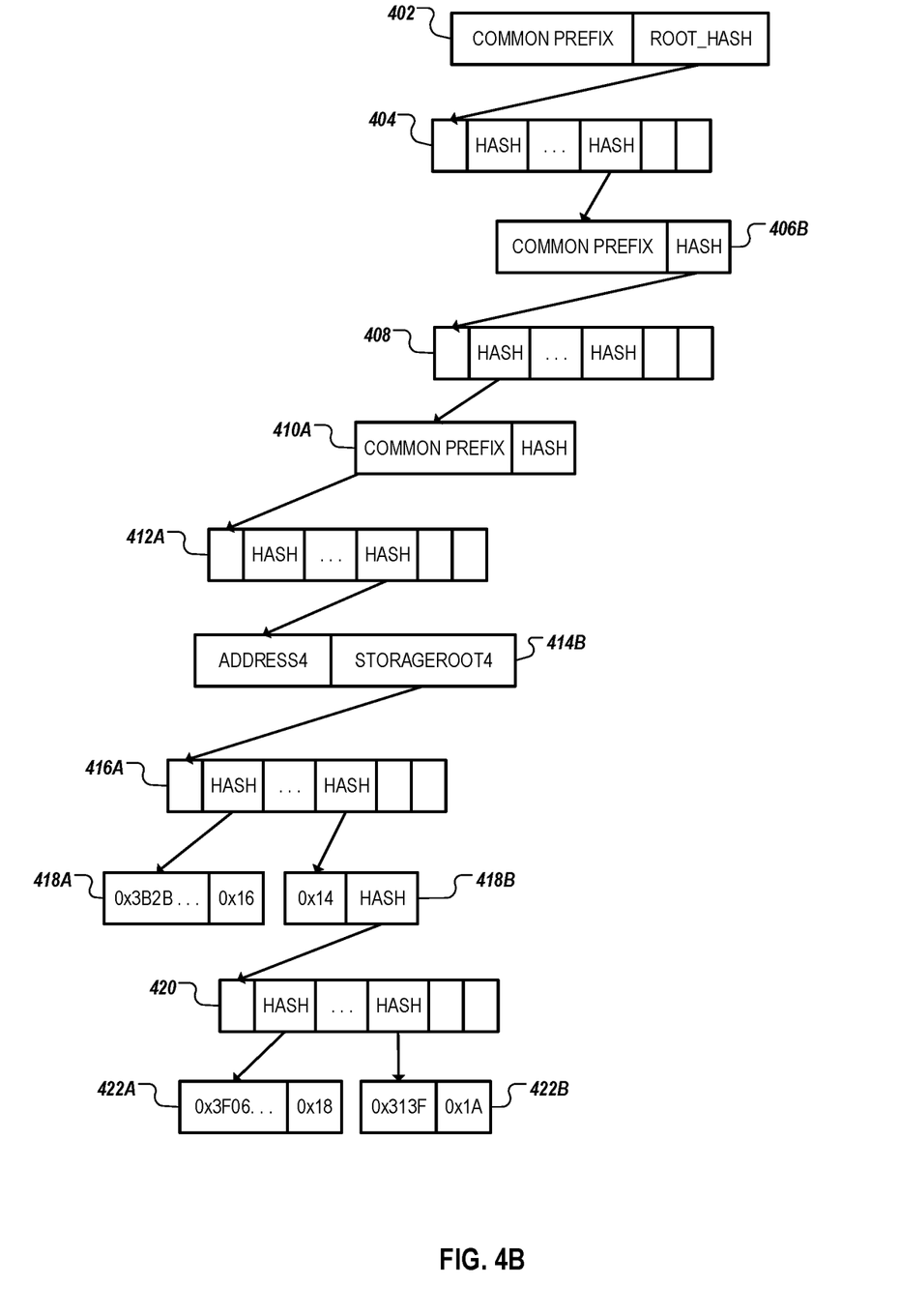
FIG. 4B depicts an example of an isolated world state data structure for the light-weight node depicted in FIG. 3.

FIG. 4B depicts an example of a world state data structure represented by an isolated MPT 405 for the light-weight node depicted in FIG. 3. In this example, the isolated MPT 405 is generated by a blockchain node, e.g., the blockchain node 320, based on the original MPT 400 depicted in FIG. 4A. The isolated MPT 405 omits account records that the light-weight node is not authorized to access. For example, the MPT 405 omits all nodes in region 400B of the MPT 400, including account records 418C and 418D. As discussed above, these account records are not authorized for access by the light-weight node and therefore omitted from the isolated MPT 405.

In the example depicted in FIG. 4B, the isolated MPT 405 is generated based on parsing each account record (in leaf and branch nodes, as described above) and their parent and child elements of the original MPT 400 and determining whether the account records or data elements are authorized for access by the light-weight node. In some instances, this determination is based on identifying permissioned addresses that are identified in an access control table stored on the blockchain node. For example, the keys "0x3F06" and "0x313F" included in account records 422A and 422B are included in the access control table, and as a result the account records 422A and 422B are included in the isolated MPT 405. In contrast, the keys "0x4E06" and "0x4E3F" included in account records 418C and 418D are not included in the access control table, and therefore are omitted from the isolated MPT 405.

As shown in FIG. 4B, intermediate nodes on the path from the account records 422A and 422B to the root node 402 of the MPT 400 are preserved in the isolated MPT 405. These intermediate nodes include branch nodes (e.g., 416A, 420) and extension nodes (e.g., 406B, 410A, 418B) of the MPT 400.

Figure 5:
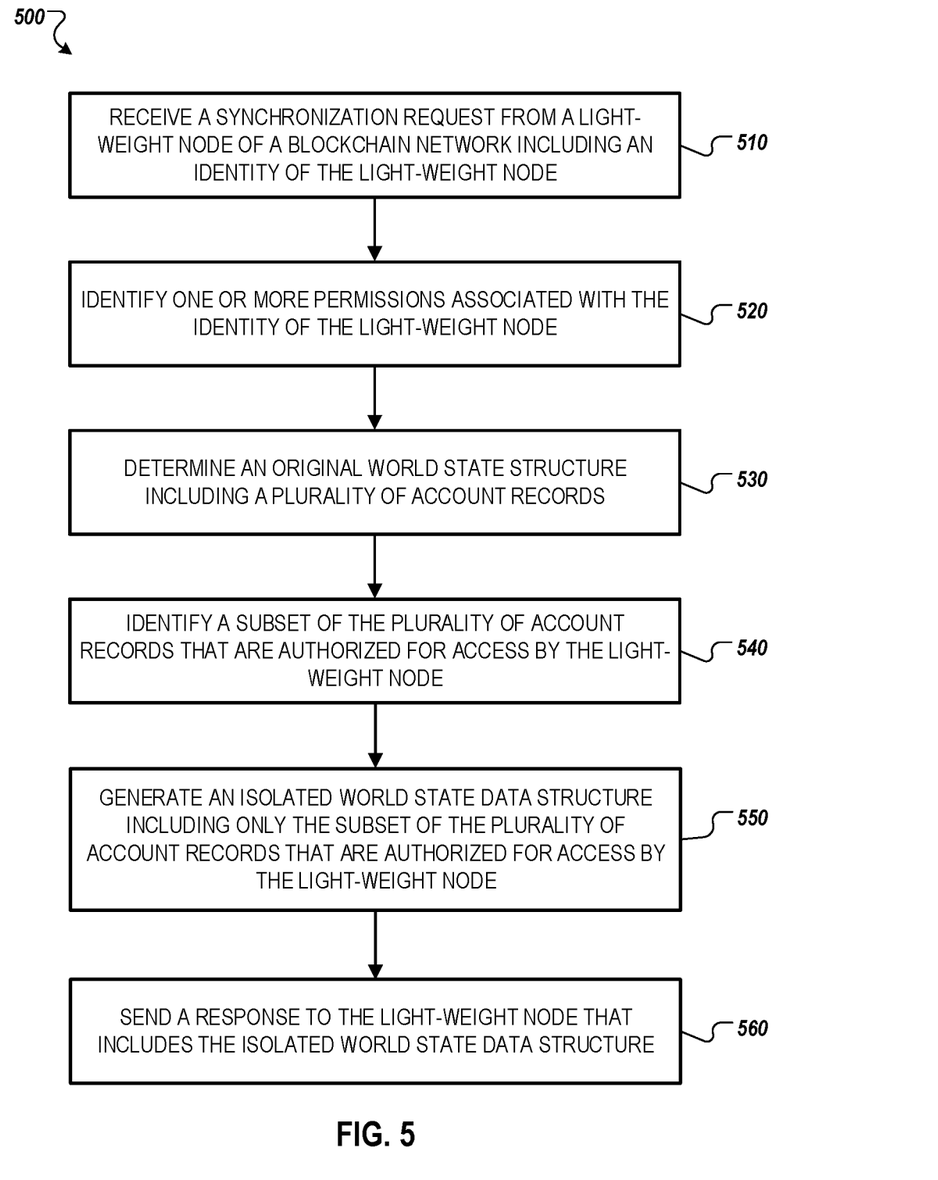
FIG. 5 depicts an example of a process that can be executed in accordance with implementations of this specification.

FIG. 5 depicts an example of a process 500 that can be executed in accordance with implementations of this specification. In some implementations, the process 500 may be performed using one or more computer-executable programs executed using one or more computing devices.

At 510, the blockchain node receives a synchronization request from a light-weight node. For example, the blockchain node 320 of a blockchain network receives a synchronization request for a world state of the blockchain network. The synchronization request is received from the light-weight node 310 and includes an identity of the light-weight node 310, such as an identifier for an entity associated with the light-weight node 310. The synchronization request can include a block height representing a number of blocks from a genesis block, e.g., a block associated with the most recent prior synchronization point.

As discussed above, the synchronization request can be generated based on detecting a synchronization trigger condition, such as a threshold number of blocks being added to the blockchain network since the last synchronization point, or the occurrence of a specified event in the blockchain network that necessitates synchronization of the world state data structure between the light-weight node, the blockchain node, and the blockchain network.

At 520, the blockchain node identifies one or more permissions associated with an identity of the light-weight node. In some cases, identifying the one or more permissions associated with the identity of the light-weight node includes accessing an access control table that specifies one or more permissions for a plurality of identities of a plurality of light-weight nodes of the blockchain network; and identifying one or more permissions specified in the access control table for the identity of the light-weight node. In some implementations, the access control table includes an identity class associated with each of the plurality of identities of the plurality of light-weight nodes of the blockchain network; and permissions associated with each identity class included in the access control table. In some cases, the one or more permissions comprises a permission that specifies that the identity of the light-weight node is authorized to access account records associated with a set of permissioned account addresses.

At 530, the blockchain node determines an original world state data structure (e.g., MPT 400) including a plurality of account records and associated with the block height. For example, the blockchain node 320 determines the original MPT 400 that represents a world state data structure of the blockchain network at a time when a block associated with the block height was added to the blockchain. As discussed above, the original MPT 400 includes account records that authorized for access by the light-weight node 310.

At 540, the blockchain node identifies a subset of the plurality of account records that are authorized for access by the light-weight node 310. For example, the blockchain node 320 identifies account records that include addresses that are specified as permissioned addresses in the access control list and which are authorized for access to the blockchain node 320.

At 550, the blockchain node generates an isolated world state data structure including only the subset of the plurality of account records that are authorized for access by the light-weight node. For example, the blockchain node 320 generates the isolated MPT 405 that omits account records from region 400B of the original MPT 400. In some cases, generating the isolated MPT comprises modifying the original MPT to produce the isolated MPT, including removing all account records that are determined to not be accessible by the light-weight node from the original MPT; and removing branches of the original MPT from which all account records have been removed leaving only a root hash of each of the branches intact. In some implementations, an account record is determined to not to be accessible by the light-weight node if the one or more permissions indicate that the light-weight node does not have read access to the account record. In some cases, generating the isolated MPT includes identifying an account record in the original MPT that is accessible to the light-weight node, wherein the account record is located in a particular node of the original MPT; identifying a path in the original MPT from the particular node storing the account record to a root node of the MPT; identifying intermediate nodes located in the original MPT along the path from the particular node storing the account record to the root node of the MPT; and including the intermediate nodes in the isolated MPT.

At 560, the blockchain node sends a response to the synchronization request to the light-weight node that includes the isolated world state data structure. For example, the blockchain node 320 sends the isolated MPT 405 to the light-weight node 310 as a response to the synchronization request received at step 510. The light-weight node 310 can store the isolated MPT as the locally stored world state of the blockchain network until the next synchronization step. As described throughout and shown in FIGS. 4A and 4B, the isolated MPT 405 specifies the same world state data structure as the original MPT but omits certain account records to permit the light-weight node 310 to be synchronized with the blockchain node 320 without requiring the light-weight node 310 to access account records that are not authorized for access by the light-weight node 310.

In some implementations, upon receiving the isolated MPT 405, the light-weight node 310 can replace its local version of isolated MPT with the updated version of the isolated MPT returned from the blockchain node.

Figure 6:
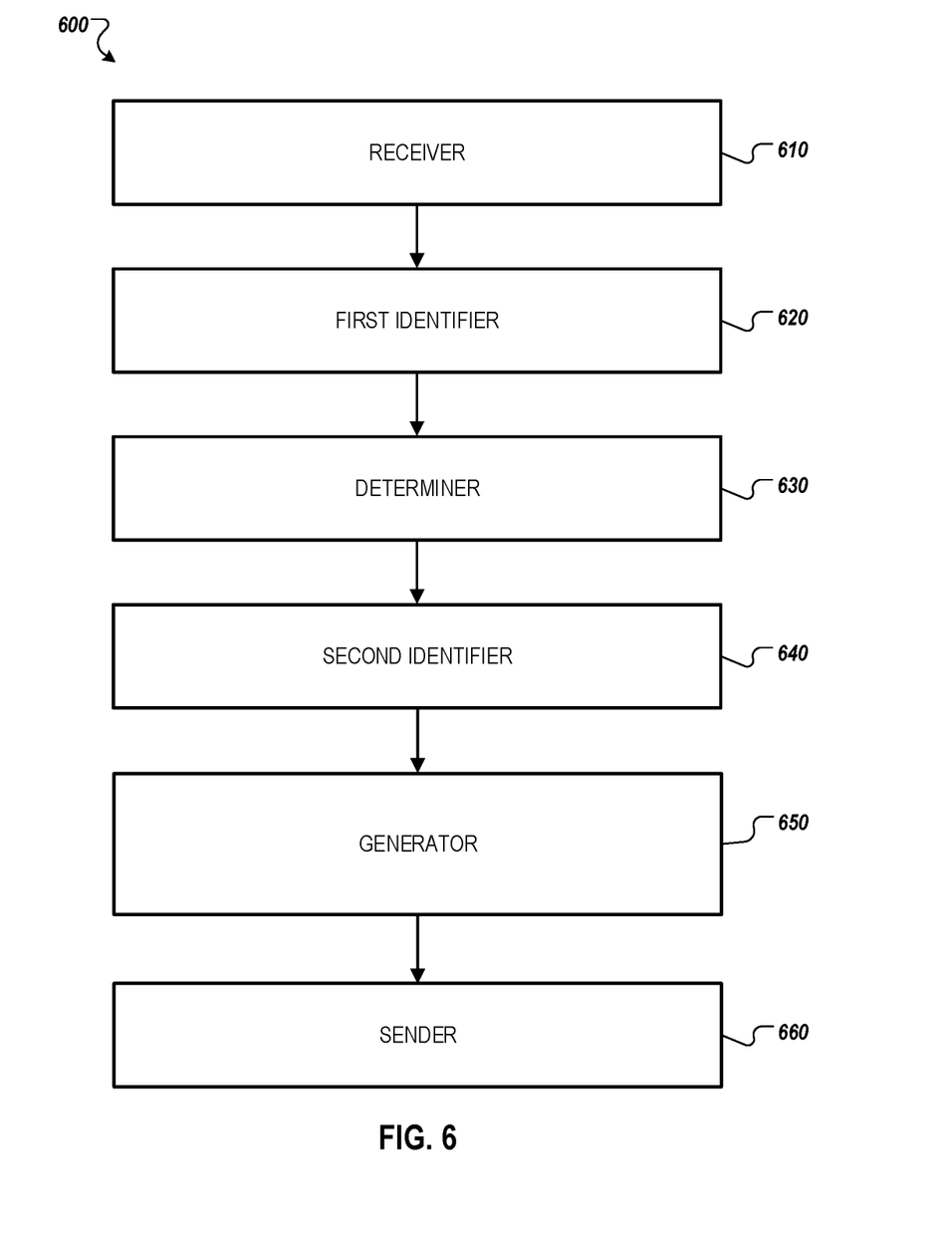
FIG. 6 depicts examples of modules of an apparatus in accordance with implementations of this specification.

FIG. 6 depicts examples of modules of an apparatus 600 in accordance with implementations of this specification. The apparatus 600 can be an implementation of a blockchain node configured to protect sensitive data stored on a blockchain maintained by a blockchain network, such as a consortium blockchain network. The apparatus 600 can correspond to the implementations described above, and the apparatus 600 includes the following: a receiver or receiving module 610 for receiving a synchronization request from a light-weight node of the blockchain network, wherein the synchronization request includes an identity of the light-weight node; a first identifier or identifying module 620 for identifying one or more permissions associated with the identity of the light-weight node; a determiner or determining module 630 for determining an original world state structure including a plurality of account records, each account record storing state information for an account associated with the account record; a second identifier or identifying module 640 for identifying, based on the one or more permissions, a subset of the plurality of account records that are authorized for access by the light-weight node; a generator or generating module 650 for generating an isolated world state structure based on the original world state data structure, the isolated world state structure including only the subset of the plurality of account records that are authorized for access by the light-weight node; and a sender or sending module 660 for sending a response to the light-weight node that includes the isolated world state data structure.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of this specification without creative efforts.

Referring again to FIG. 6, it can be interpreted as illustrating an internal functional module and a structure of a blockchain node configured to protect sensitive data stored on a blockchain maintained by a blockchain network. An execution body in essence can be an electronic device, and the electronic device includes the following: one or more processors; and a memory storing an executable instruction of the one or more processors.

The techniques described in this specification produce several technical effects. For example, the techniques for producing the isolated world state structure (e.g., the MPT) enable light-weight nodes in a blockchain network to verify transactions based on the world state structure without violating access control permissions of the blockchain network. This allows for more effective control of data access in the blockchain network, which can lead to a more secure network. In addition, the techniques to produce the isolated world state structure result in a structure that is consistent with the non-isolated world state structure. This can allow the light-weight nodes to verify transactions based on the isolated world state structure using the same process as the non-isolated world state structure, thereby alleviating any need to update the light-weight nodes to enforce access control. In yet other implementations, the techniques strike a balance between transparency and data-protection in blockchain networks. Specifically, blockchain designers face a conundrum when faced with building a system. On the one hand, blockchains are all about transparent auditability, achieving trust through shared distributed ledgers. On the other hand, enterprise transactions often deal with sensitive data that should not be shared amongst all participants for a number of reasons. The techniques protect participants' data, while at the same time maintaining the advantages of decentralized trust and transparency.

Described embodiments of the subject matter can include one or more features, alone or in combination.

In some embodiments, actions include receiving, by a blockchain node in the blockchain network, a synchronization request from a light-weight node of the blockchain network, wherein the synchronization request includes an identity of the light-weight node and a block height associated with the synchronization request; identifying, by the blockchain node, one or more permissions associated with the identity of the light-weight node; determining, by the blockchain node, an original world state structure associated with the block height and including a plurality of account records, each account record storing state information for an account associated with the account record, wherein the original world state structure represents a state of the blockchain network at a time when a block associated with the block height was added to the blockchain; identifying, by the blockchain node and based on the one or more permissions, a subset of the plurality of account records that are authorized for access by the light-weight node; generating, by the blockchain node, an isolated world state structure based on the original world state data structure, the isolated world state structure including only the subset of the plurality of account records that are authorized for access by the light-weight node; and sending, by the blockchain node, a response to the light-weight node that includes the isolated world state data structure.

Other embodiments include corresponding systems, apparatus, and computer programs, configured to perform the actions of the methods, encoded on computer storage devices.

These and other embodiments may each optionally include one or more of the following features:

In some cases, identifying the one or more permissions associated with the identity of the light-weight node comprises accessing an access control table that specifies one or more permissions for a plurality of identities of a plurality of light-weight nodes of the blockchain network; and identifying one or more permissions specified in the access control table for the identity of the light-weight node.

In some embodiments, the access control table includes an identity class associated with each of the plurality of identities of the plurality of light-weight nodes of the blockchain network; and permissions associated with each identity class included in the access control table.

In some embodiments, the one or more permissions comprises a permission that specifies that the identity of the light-weight node is authorized to access account records associated with a set of permissioned account addresses.

In some embodiments, the original world state structure is an original Merkle Patricia Trie (MPT) and the isolated world state structure is an isolated MPT.

In some embodiments, generating the isolated MPT comprises modifying the original MPT to produce the isolated MPT, including: removing all account records that are determined to not be accessible by the light-weight node from the original MPT; and removing branches of the original MPT from which all account records have been removed leaving only a root hash of each of the branches intact.

In some embodiments, an account record is determined not to be accessible by the light-weight node if the one or more permissions indicate that the light-weight node does not have read access to the account record.

In some embodiments, generating the isolated MPT includes: identifying an account record in the original MPT that is accessible to the light-weight node, wherein the account record is located in a particular node of the original MPT, wherein the particular node is a branch node or a leaf node; identifying a path in the original MPT from the particular node storing the account record to a root node of the MPT; identifying intermediate nodes located in the original MPT along the path from the particular node storing the account record to the root node of the MPT; and including the intermediate nodes in the isolated MPT.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for isolating data stored on a blockchain maintained by a blockchain network, the method comprising:
   receiving, by a blockchain node in the blockchain network, a synchronization request from a light-weight node of the blockchain network, wherein the synchronization request comprises an identity of the light-weight node and a block height associated with the synchronization request;
   identifying, by the blockchain node, one or more permissions associated with the identity of the light-weight node;
   determining, by the blockchain node, an original world state structure comprising a plurality of account records that are within the block height specified by the synchronization request, each account record storing state information for an account associated with the account record, wherein the original world state structure is determined based on the block height associated with the synchronization request and comprises a plurality of blocks in the blockchain network between a block to be synchronized and a genesis block at a time when the block associated with the block height was added to the blockchain network, and wherein the original world state structure is an original Merkle Patricia Trie (MPT);
   identifying, by the blockchain node and based on the one or more permissions, a subset of the plurality of account records that are authorized for access by the light-weight node;
   identifying, by the blockchain node, a plurality of inaccessible account records that are not accessible by the light-weight node, wherein the one or more permissions indicate that the light-weight node does not have read access to each inaccessible account record in the plurality of inaccessible account records;
   generating, by the blockchain node, an isolated world state structure by removing the plurality of inaccessible account records from the original world state structure and by removing branches of the original world state structure from which one or more of the plurality of inaccessible account records have been removed leaving only a root hash of each of the branches intact, the isolated world state structure comprising only the subset of the plurality of account records that are authorized for access by the light-weight node; and sending, by the blockchain node, a response to the light-weight node that comprises the isolated world state structure.

2. The computer-implemented method of claim 1, wherein identifying the one or more permissions associated with the identity of the light-weight node comprises:
accessing an access control table that specifies one or more permissions for a plurality of identities of a plurality of light-weight nodes of the blockchain network; and
identifying one or more permissions specified in the access control table for the identity of the light-weight node.

3. The computer-implemented method of claim 2, wherein the access control table comprises:
an identity class associated with each of the plurality of identities of the plurality of light-weight nodes of the blockchain network; and
permissions associated with each identity class included in the access control table.

4. The computer-implemented method of claim 2, wherein the one or more permissions comprises a permission that specifies that the identity of the light-weight node is authorized to access account records associated with a set of permissioned account addresses.

5. The computer-implemented method of claim 1, wherein generating the isolated world state structure comprises:
identifying an account record in the original world state structure that is accessible to the light-weight node, wherein the account record is located in a node of the original world state structure, wherein the node is a branch node or a leaf node;
identifying a path in the original world state structure from the node storing the account record to a root node of the original world state structure;
identifying intermediate nodes located in the original world state structure along the path from the node storing the account record to the root node of the original world state structure; and
comprising the intermediate nodes in the isolated world state structure.

6. A non-transitory computer-readable storage medium storing one or more instructions executable by a computer system to perform operations comprising:
receiving, by a blockchain node in a blockchain network, a synchronization request from a light-weight node of the blockchain network, wherein the synchronization request comprises an identity of the light-weight node and a block height associated with the synchronization request;
identifying, by the blockchain node, one or more permissions associated with the identity of the light-weight node;
determining, by the blockchain node, an original world state structure comprising a plurality of account records that are within the block height specified by the synchronization request, each account record storing state information for an account associated with the account record, wherein the original world state structure is determined based on the block height associated with the synchronization request and comprises a plurality of blocks in the blockchain network between a block to be synchronized and a genesis block at a time when the block associated with the block height was added to the blockchain network, and wherein the original world state structure is an original Merkle Patricia Trie (MPT);
identifying, by the blockchain node and based on the one or more permissions, a subset of the plurality of account records that are authorized for access by the light-weight node;
identifying, by the blockchain node, a plurality of inaccessible account records that are not accessible by the light-weight node, wherein the one or more permissions indicate that the light-weight node does not have read access to each inaccessible account record in the plurality of inaccessible account records;
generating, by the blockchain node, an isolated world state structure by removing the plurality of inaccessible account records from the original world state structure and by removing branches of the original world state structure from which one or more of the plurality of inaccessible account records have been removed leaving only a root hash of each of the branches intact, the isolated world state structure comprising only the subset of the plurality of account records that are authorized for access by the light-weight node; and
sending, by the blockchain node, a response to the light-weight node that comprises the isolated world state structure.

7. The non-transitory computer-readable storage medium of claim 6, wherein identifying the one or more permissions associated with the identity of the light-weight node comprises:
accessing an access control table that specifies one or more permissions for a plurality of identities of a plurality of light-weight nodes of the blockchain network; and
identifying one or more permissions specified in the access control table for the identity of the light-weight node.

8. The non-transitory computer-readable storage medium of claim 7, wherein the access control table comprises:
an identity class associated with each of the plurality of identities of the plurality of light-weight nodes of the blockchain network; and
permissions associated with each identity class included in the access control table.

9. The non-transitory computer-readable storage medium of claim 7, wherein the one or more permissions comprises a permission that specifies that the identity of the light-weight node is authorized to access account records associated with a set of permissioned account addresses.

10. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a blockchain node in a blockchain network, a synchronization request from a light-weight node of the blockchain network, wherein the synchronization request comprises an identity of the light-weight node and a block height associated with the synchronization request;
identifying, by the blockchain node, one or more permissions associated with the identity of the light-weight node;

determining, by the blockchain node, an original world state structure comprising a plurality of account records that are within the block height specified by the synchronization request, each account record storing state information for an account associated with the account record, wherein the original world state structure is determined based on the block height associated with the synchronization request and comprises a plurality of blocks in the blockchain network between a block to be synchronized and a genesis block at a time when the block associated with the block height was added to the blockchain network, and wherein the original world state structure is an original Merkle Patricia Trie (MPT);

identifying, by the blockchain node and based on the one or more permissions, a subset of the plurality of account records that are authorized for access by the light-weight node;

identifying, by the blockchain node, a plurality of inaccessible account records that are not accessible by the light-weight node, wherein the one or more permissions indicate that the light-weight node does not have read access to each inaccessible account record in the plurality of inaccessible account records;

generating, by the blockchain node, an isolated world state structure by removing the plurality of inaccessible account records from the original world state structure and by removing branches of the original world state structure from which one or more of the plurality of inaccessible account records have been removed leaving only a root hash of each of the branches intact, the isolated world state structure comprising only the subset of the plurality of account records that are authorized for access by the light-weight node; and sending, by the blockchain node, a response to the light-weight node that comprises the isolated world state structure.

11. The computer-implemented system of claim 10, wherein identifying the one or more permissions associated with the identity of the light-weight node comprises:

accessing an access control table that specifies one or more permissions for a plurality of identities of a plurality of light-weight nodes of the blockchain network; and identifying one or more permissions specified in the access control table for the identity of the light-weight node.

12. The computer-implemented system of claim 11, wherein the access control table comprises:

an identity class associated with each of the plurality of identities of the plurality of light-weight nodes of the blockchain network; and permissions associated with each identity class included in the access control table.

13. The computer-implemented system of claim 11, wherein the one or more permissions comprises a permission that specifies that the identity of the light-weight node is authorized to access account records associated with a set of permissioned account addresses.

14. The computer-implemented system of claim 10, wherein generating the isolated world state structure comprises modifying the original world state structure to produce the isolated world state structure.

15. The computer-implemented system of claim 10, wherein generating the isolated world state structure comprises:

identifying an account record in the original world state structure that is accessible to the light-weight node, wherein the account record is located in a node of the original world state structure, wherein the node is a branch node or a leaf node;

identifying a path in the original world state structure from the node storing the account record to a root node of the original world state structure;

identifying intermediate nodes located in the original world state structure along the path from the node storing the account record to the root node of the original world state structure; and comprising the intermediate nodes in the isolated world state structure.

* * * * *